United States Patent Office 3,548,321
Patented Dec. 15, 1970

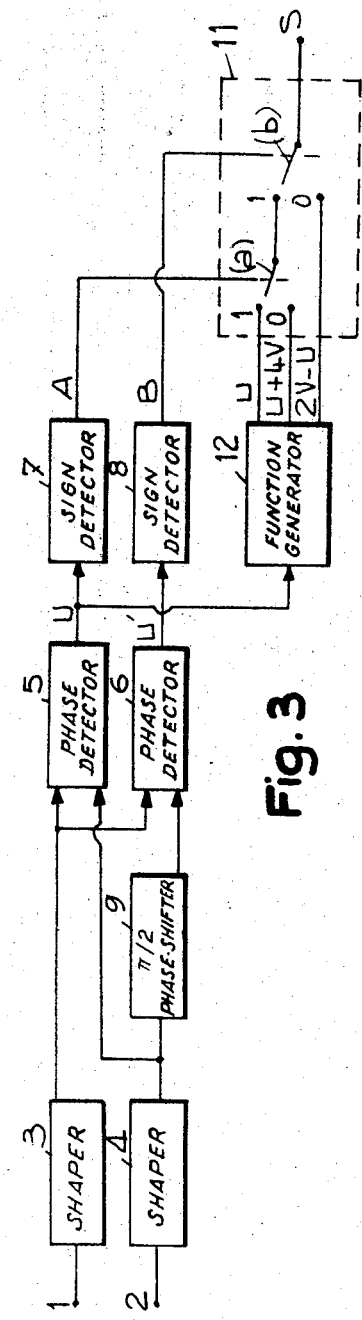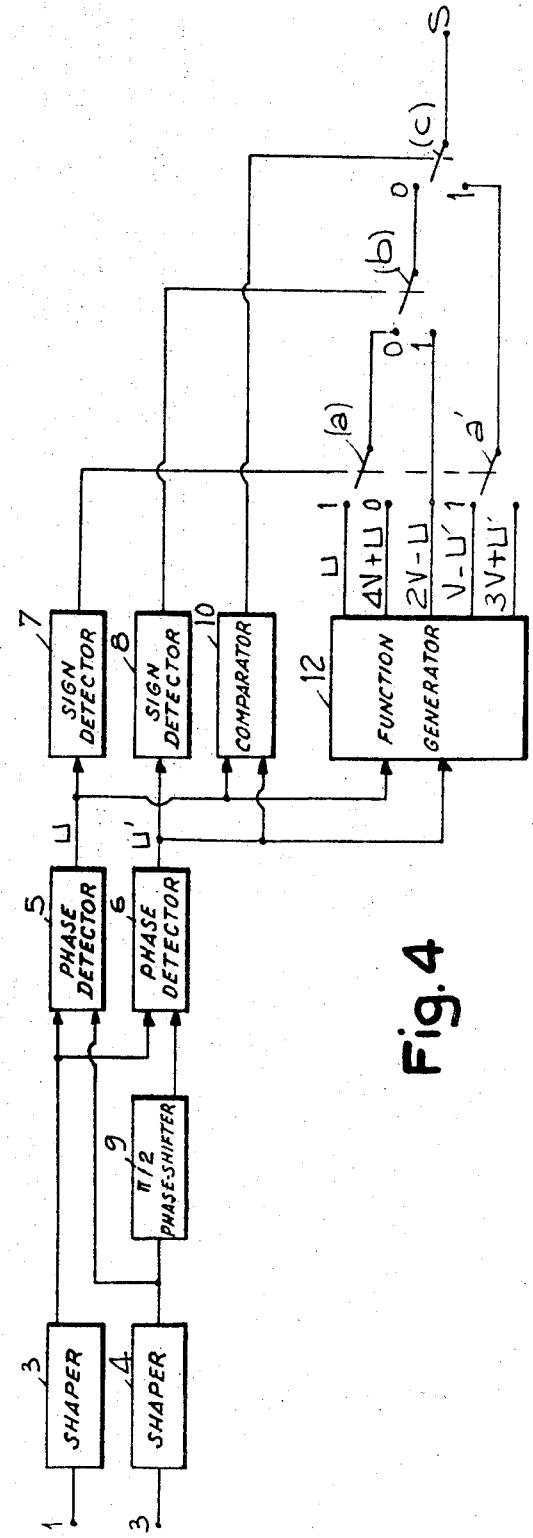

3,548,321
PHASE MEASURING DEVICE FOR SUPPLYING A SIGNAL PROPORTIONAL TO THE MEASURED PHASE
Philippe Duquesne, Paris, France, assignor to CSF-Compagnie Generale de Telegraphie Sans Fil, a corporation of France
Filed May 3, 1968, Ser. No. 726,416
Claims priority, application France, May 9, 1967, 105,754
Int. Cl. H03k 9/06; H03d 13/00
U.S. Cl. 328—133                      24 Claims

ABSTRACT OF THE DISCLOSURE

A system which supplies a signal varying linearly with the phase difference between two input signals comprises two conventional phase detecting devices supplying signals, respectively proportional to the sine and to the cosine of said phase difference, a logic circuit, fed with said sine and cosine signals, which logic circuit defines in which one of predetermined intervals, submultiples of $\pi$, is comprised the phase to be measured, and which controls the elaboration of a phase indicative signal as a linear function of said sine and cosine signals, the parameters of the linear function changing when the interval changes, and being constant within each interval.

---

The present invention relates to the measurement of the phase difference between two continuous or not continuous signals, i.e. their relative phase, for example, in electromagnetic detection, the measurement of the phase difference between the received and the transmitted wave, or between the echo pulse and a so-called "coherent" oscillation, i.e., an oscillation in phase with the carrier of the transmitted pulse.

Known phase detectors supply a signal, for example, a voltage, which is proportional to the cosine or to the sine of the relative phase. This is therefore a non linear signal having the same indetermination as the corresponding function. The linearity defect may be corrected to a substantial degree by first transforming the signals to be compared into square-wave signals, but the indetermination of the phase value remains.

An arrangement for measuring the phase, free of this drawback has already been proposed; this is a complex assembly comprising not less than $N/2$ phase shifters and as many conventional phase detectors and comparators for achieving a precision of $\pi/N$ in the phase measurement, which measurement is in a form suitable for being directly coded numerically, for example in the binary code.

It is an object of the invention to provide a system of comparatively simple construction for achieving a substantially linear measurement of the phase without any ambiguity.

According to the invention, there is provided a system for unambiguously defining the phase shift $\varphi$ between a first and a second signal comprising:

First means for phase shifting said first signal by $\pi/2$, thus providing a third signal; second means for providing periodic signals having the periodicity of trigonometric lines, respectively representative of the phase shift between said first and second signals and between said first and third signals as $\varphi$ varies from 0 to $2\pi$; third means for defining a set of values of at least one of said periodic signals, differing from each other, and respectively corresponding to values of $\varphi$ in predetermined intervals of said variation of $\varphi$, said third means having an output; logic means, including means having respective outputs for detecting the instantaneous signs of said periodic signals, for determining in which of said intervals is comprised the instantaneous value of $\varphi$, said logic means having an output; and selecting means having a control input coupled to said logic means output and a signal input coupled to said third means output, for supplying a signal proportional to said instantaneous value of $\varphi$.

Figure 1:
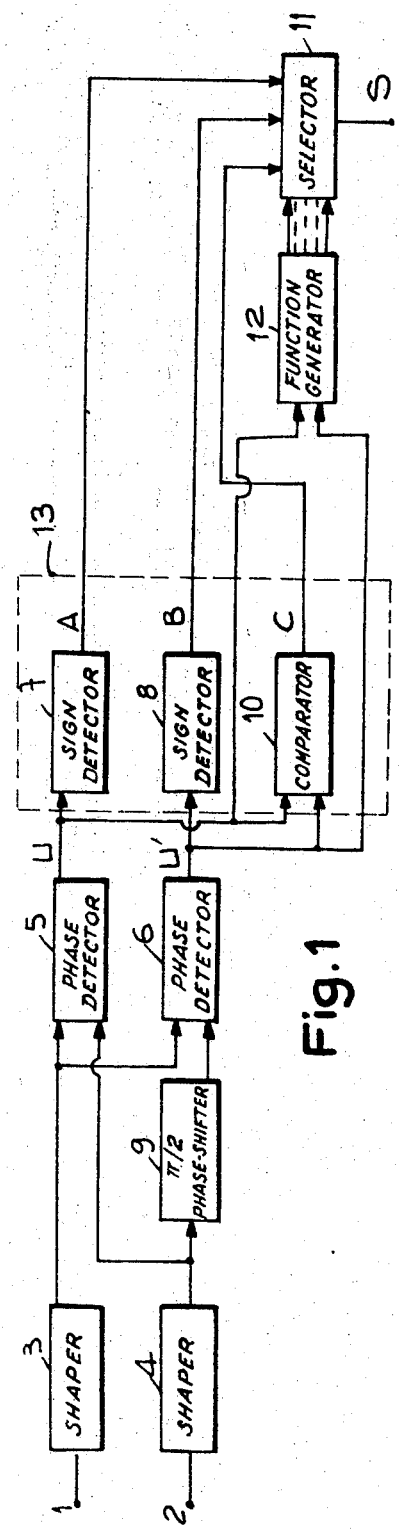
Figure 2:
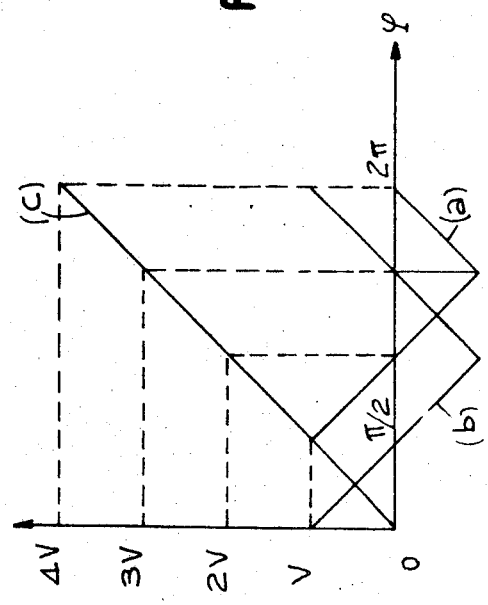
Figure 5:
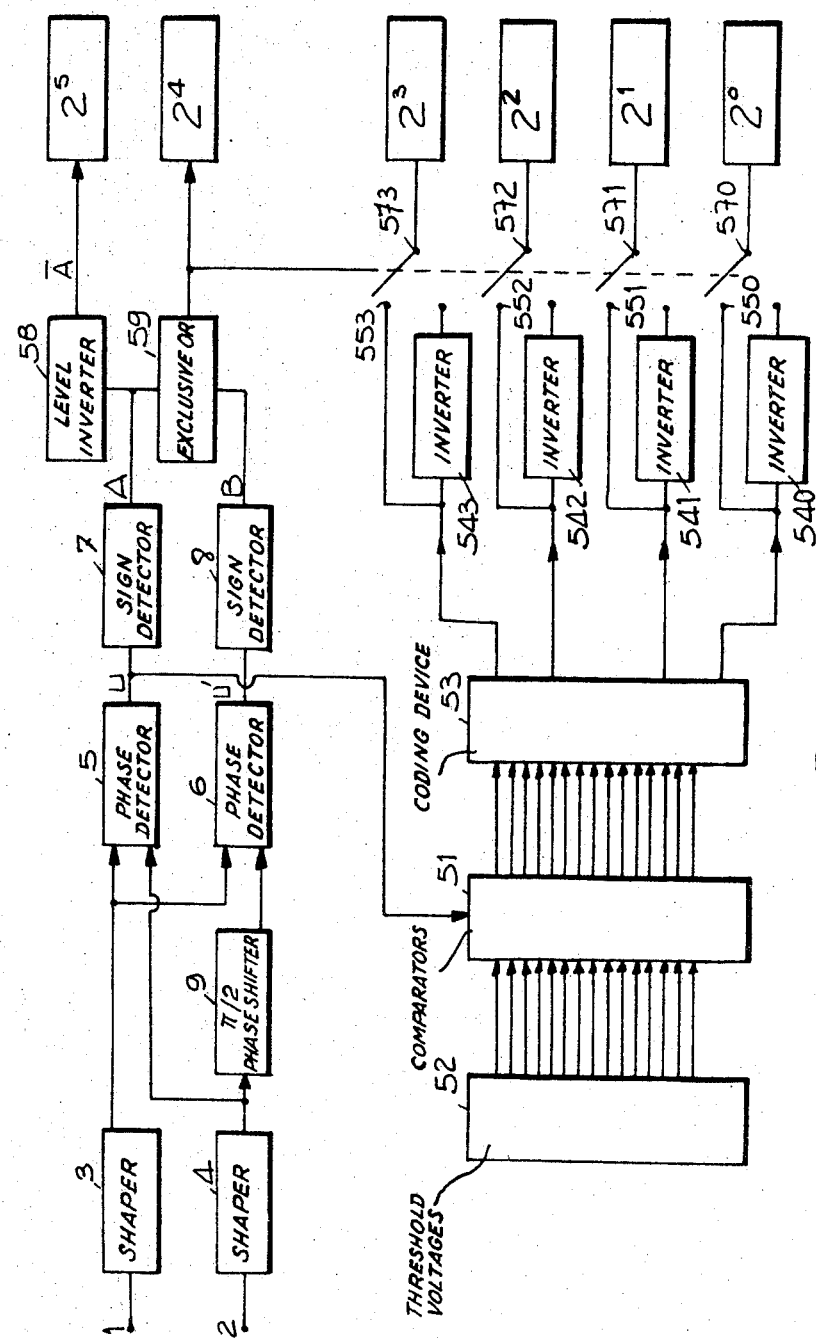
Figure 6:
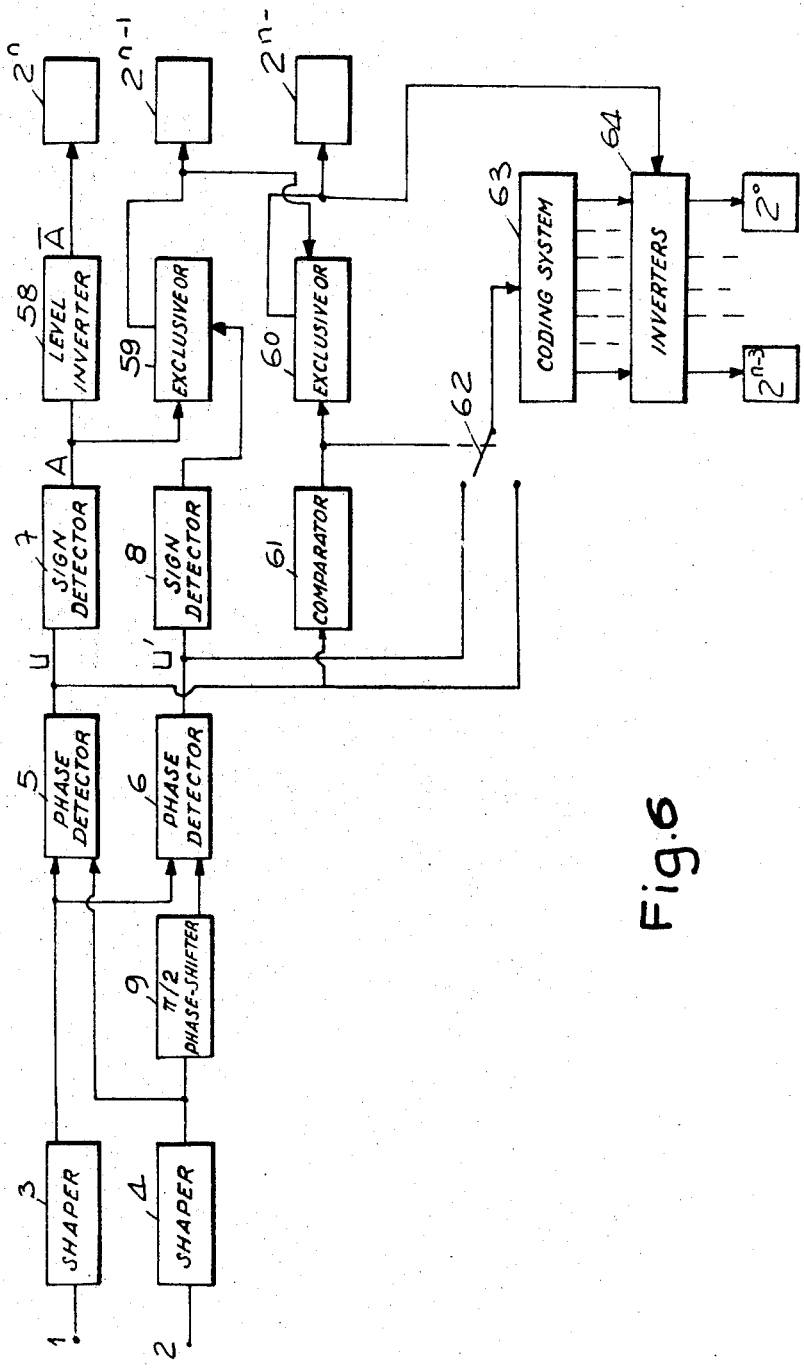
Figure 7:
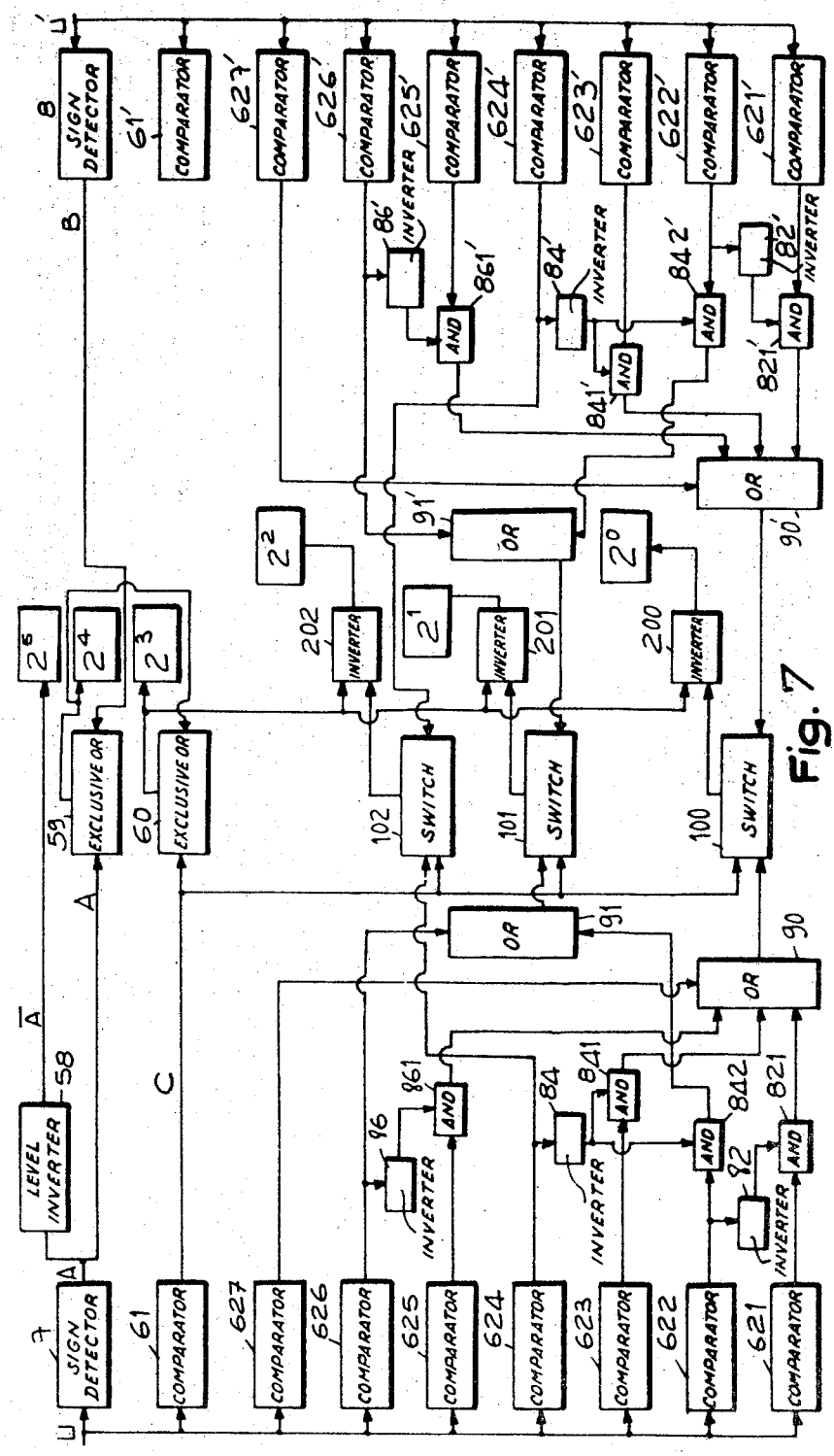

For a better understanding of the invention and to show how the same may be carried into practice reference will be made to the drawings accompanying the following description and in which:

FIG. 1 shows diagrammatically the principle of the invention;
FIG. 2 is an explanatory diagram;
FIGS. 3 and 4 are embodiments of arrangements according to the invention; and
FIGS. 5 to 7 are further embodiments of the invention.

In the arrangement shown in FIG. 1 the signals, whose relative phase is to be measured, are applied to terminals 1 and 2. These signals are preferably first transformed into square wave signals, for example, in limiter amplifiers 3 and 4.

The output of the limiter 3 is coupled to the inputs of identical phase detectors 5 and 6. The output of the limiter 4 is connected directly to the detector 5, and, after a phase shift by $\pi/2$ at 9, to the detector 6. When driven by square wave signals, the detectors 5 and 6, which are known per se, supply voltages U and U', respectively, which are shown in FIG. 2 at (a) and (b). The relative phase shift $\varphi$ of the input signals is plotted along the abscissae. These signals are "triangular" voltages, i.e. a linearized sinusoid and a linearized cosinusoid formed by a succession of rectilinear segments, and the ordinate varies between 0 and V. At (c) is shown a function of the phase: it varies linearly from 0 to 4V, when $\varphi$ varies from 0 to $2\pi$ and is derived simply from successive segments of the curves (a) and (b).

In fact, these segments are not strictly speaking rectilinear.

According to whether these segments are more or less rectilinear, the curve (c) will be "formed" by means of one signal only, signal U or signal U', or by means of the signals U and U', each of these signals being then used in the part thereof which it is most linear, i.e., between 0 and $|V/2|$, for example.

In all cases, the curve (c) is derived from the juxtaposition of a certain number of sections, each of which represents a linear function of U or U'. The choice of these functions is determined by the signs of the function U and U', and their comparison with $V/2$ in the most elaborate case. To this end, the voltages U and U' are compared in a comparator 10 and transformed in polarity detectors 7 and 8 into signals A, B, equal to "0" and "1," according to whether they are negative or positive. A selector 11, coupled to the outputs of detectors 7 and 8 and comparator 10 decides for a given value of $\varphi$ which function of U or U', elaborated in the multiple functions generator 12, is to be selected and thus, at the output S, is supplied a voltage which is a linear function of the relative phase.

The comparator 10 may be replaced by a comparator with $V/2$ of one of the voltages U, U'.

FIG. 3 shows by way of example one embodiment of the arrangement according to the invention in the simplest case in which the segments forming the curve (a) may be regarded as being sufficiently linear. In this case, the comparator 10 is omitted, or, if it is present, it serves only for controlling the operation. It can be seen that the curve (c) is obtained by juxtaposing:

between 0 and $\pi/2$: the function U
between $\pi/2$ and $3\pi/2$: the function $2V - U$
between $3\pi/2$ and $2\pi$: the function $4V + U$ A first switch (a), controlled by the signal A chooses between the predetermined functions U and $4V+U$ supplied by the generator 12, and a second switch (b) controlled by the signal B chooses between the function selected by the switch (a) and the predetermined function $2V-U$ also supplied by the generator 12. The switches are placed into the positions 0 and 1 according to whether their control signal is 0 or 1.

The following table summarises the operation of the circuit:

| $\varphi$ | 0 to $\pi/2$ | $\pi/2$ to $\pi$ | $\pi$ to $3\pi/2$ | $3\pi/2$ to $2\pi$ |
|---|---|---|---|---|
| A | 1 | 1 | 0 | 0 |
| B | 1 | 0 | 0 | 1 |
| (a) | U | U | $U+4V$ | $U+4V$ |
| (b) | (a) | $2V-U$ | $2V-U$ | (a) |
| S | 4U | $2V-U$ | $2V-U$ | $U+4V$ |

FIG. 4 is an example of an arrangement according to the invention in a more complex case where the function (a) and (b) are not sufficiently linear and where the most linear portions of these functions are used. The generator 12 forms the predetermined functions U, $4V+U$, $2V-U$ and $V-U'$, $3V+U'$.

The switches (a) and (b) choose as in the preceding case between the functions U, $U+4V$ and $2V-U$, whilst a switch (a'), ganged with the switch (a), chooses between $V-U'$ and $3V+U'$; a switch (c) controlled by the signal C, which is equal to 0 or 1 according to whether U is lower or higher than U', chooses between the switches b and a'.

The following table summarises the operation of this circuit:

The signal U is applied to the respective inputs of $(2^{n-1}-1)=15$ comparators 51, whose thresholds are spaced between 0 and V by intervals equal to $V/16$, the threshold voltages being recorded at 52. These comparators deliver quantized signals "1" when the voltage U is higher than their threshold. These signals are applied to a coder 53 which transforms the number delivered and defined by the position number of the highest energized output of the comparators 51, into the binary code. The output of the coder are either used as such or reversed, according to whether the digit $2^{n-1}$ is absent or present.

To this end, the four outputs of the coder 53 representing respectively the digits $2^{n-2}$, $2^{n-3}$, $2^{n-4}$, $2^0$ are connected, respectively, to inverters 540 to 543 and to terminals 550 to 553. Four switches 570 to 573 actuated in synchronism by the digit $2^{n-1}$ select for each digit the direct indication or the reversed one, i.e. 1 or 0.

The digit $2^n$ is present for $\varphi$ higher than $\pi$, i.e. for $\overline{A}=1$, where $\overline{A}$ is the reverse of A and the digit $2^{n-2}$ for A or B (not A or/and B) equal to 1. To this end, the signal A is applied at 58 to an inverter controlling the presence of the digit $2^n$ and the signals A and B are applied at 59 to an EXCLUSIVE OR-circuit (exclusive of "AND") which controls the presence of the digit $2^{n-1}$.

The following table explains the operation of this circuit with simultaneous reference to FIG. 2 and assuming $n=5$.

Actually, it can be seen in FIG. 2 that the binary indication must be reversed every time $|U|$ decreases when $\varphi$ increases, i.e., when $$\frac{d|U|}{d\varphi}$$

| $\varphi$ | 0 to $\pi/4$ | $\pi/4$ to $\pi/2$ | $\pi/2$ to $3\pi/4$ | $3\pi/4$ to $\pi$ | $\pi$ to $5\pi/4$ | $5\pi/4$ to $3\pi/2$ | $3\pi/2$ to $7\pi/4$ | $7\pi/4$ to $2\pi$ |
|---|---|---|---|---|---|---|---|---|
| A | 1 | 1 | 1 | 1 | 0 | 0 | 0 | 0 |
| B | 1 | 1 | 0 | 0 | 0 | 0 | 1 | 1 |
| C | 0 | 1 | 0 | 1 | 0 | 1 | 0 | 1 |
| a | U | U | U | U | $4V+U$ | $4V+U$ | $4V+U$ | $4V+U$ |
| b | a | a | $2V-U$ | $2V-U$ | $2V-U$ | $2V-U$ | a | a |
| a' | $V-U'$ | $V-U'$ | $V-U'$ | $V-U'$ | $3V+U'$ | $3V+U'$ | $3V+U'$ | $3V+U'$ |
| c | b | a' | a' | b | b | a' | a' | b |
| S | U | $V-U'$ | $V-U'$ | $2V-U$ | $2V-U$ | $3V+U'$ | $3V+U'$ | $4V+U$ |

Of course, in either case, more complex logic circuits, using a single switch controlled by the signal resulting from a combination, not only of the signals A and B, but also of their opposites $\overline{A}$ and $\overline{B}$, may be substituted for those shown in FIGS. 3 and 4 by way of example only, and which have been selected for their simplicity.

The voltage obtained at the terminal S can of course be transposed in numerical form in an analogue-to-digital converter, but, where a binary code is used for the numerical representation, the values of the binary numbers may be obtained more simply. In particular, whatever the number $n+1$ of the binary digits used, the digits having the weight $2^n$ and $2^{n-1}$ can in all cases be obtained directly from the signals A and B.

In the more complex case, corresponding to the case solved in analog form in FIG. 4, the digit having the weight $2^{n-2}$ can also be readily obtained directly, and the coding arrangement which is formed in a conventional manner by a certain number of threshold devices, will comprise only $(2^{n-1}-1)$ thresholds, whilst the direct encoding of the voltage S would necessitate $(2^{n+1}-1)$ thresholds, i.e., four times more.

FIG. 5 is a diagram of a digital phase measuring system in the case, corresponding to FIG. 3, where the voltage U is regarded as sufficiently linear between 0 and V.

It will be assumed that a binary coding with $(n+1)=6$ digits is required.

is negative, and, in the following table, the digit $2^{n-1}$ is then present and only then:

| $\varphi$ | 0 to $\pi/2$ | $\pi/2$ to $\pi$ | $\pi$ to $3\pi/2$ | $3\pi/2$ to $2\pi$ |
|---|---|---|---|---|
| A | 1 | 1 | 0 | 0 |
| B | 1 | 0 | 0 | 1 |
| $\overline{A}$ | 0 | 0 | 1 | 1 |
| $\frac{d|U|}{d\varphi}$ | >0 | <0 | >0 | <0 |
| $2^4$ | Absent | Present | Present | Present |
| $2^3$ | Absent | Absent | Absent | Present |

FIG. 6 is a basic diagram for the most complex case, corresponding to that shown in FIG. 4. The binary digits $2^n$ and $2^{n-1}$ are obtained as above. The presence of the binary digit $2^{n-2}$ is determined by the presence of the output signal of the exclusive OR-circuit 60, indicative of the presence of the digit $2^{n-1}$ or C (not or/and), where C is the output signal of the comparator 61, C being positive for $|U|>kV/2$, $k$ being here equal to 1, since the input signals have been standardized before. In the opposite case, $k$ is chosen so that the change in the state of C takes place for $U-U'$. For sinusoidal signals, the switching takes place for $$|U| \geq \frac{V}{2} \cdot \sqrt{2}$$

It will be noted that the signal C corresponds to the signal C in FIGS. 1 and 4, although differently formed.

A switch 62, controlled by the comparator 61, switches alternatively the voltages U and U' to an assembly 63, grouping the elements 52, 51, 53 of FIG. 5, the number of thresholds being reduced here to $2^{n-2}-1$, since the digit $2^{n-2}$ has been determined directly. An inverter unit 64 is or is not switched into the circuit at the outputs of the unit 63 according to whether the digit $2^{n-2}$ is present or absent.

The following table, where "0" denotes the absence of a binary number and "1" its presence, explains how the different digits are determined by the circuit of FIG. 6:

| $\varphi$ | 0 to $\pi/4$ | $\pi/4$ to $\pi/2$ | $\pi/2$ to $3\pi/4$ | $3\pi/4$ to $\pi$ | $\pi$ to $5\pi/4$ | $5\pi/4$ to $3\pi/2$ | $3\pi/2$ to $7\pi/4$ | $7\pi/4$ to $2\pi$ |
|---|---|---|---|---|---|---|---|---|
| A | 1 | 1 | 1 | 1 | 0 | 0 | 0 | 0 |
| $\overline{A}$ | 0 | 0 | 0 | 0 | 1 | 1 | 1 | 1 |
| $2^5$ | 0 | 0 | 0 | 0 | 1 | 1 | 1 | 1 |
| B | 1 | 1 | 0 | 0 | 0 | 0 | 1 | 1 |
| Excl. OR AB | 0 | 0 | 1 | 1 | 0 | 0 | 1 | 1 |
| $2^4$ | 0 | 0 | 1 | 1 | 0 | 0 | 1 | 1 |
| C | 0 | 1 | 1 | 0 | 0 | 1 | 1 | 0 |
| Excl. OR C.$2^4$ | 0 | 1 | 0 | 1 | 0 | 1 | 0 | 1 |
| $2^3$ | 0 | 1 | 0 | 1 | 0 | 1 | 0 | 1 |
| $\frac{d|U|}{d\varphi}$ | >0 | >0 | <0 | <0 | >0 | >0 | <0 | <0 |
| $\frac{d|U'|}{d\varphi}$ | <0 | <0 | >0 | >0 | <0 | <0 | >0 | <0 |
| I | 0 | 1 | 0 | 1 | 0 | 1 | 0 | 1 |

It will be recalled that the signal U is used if C is equal to $0(|U|<V/2)$ and the signal U' in the opposite case. The coding must therefore be reversed either for $$\frac{d|U|}{d\varphi} < 0$$

or for $$\frac{d|U'|}{d\varphi} < 0$$

It can be seen from the table that the inversion is controlled by the presence of the digit $2^{n-2}$, since this occurs either for C=1, when $$\frac{d|U'|}{d\varphi} < 0$$

or for C=0 when $$\frac{d|U|}{d\varphi} < 0$$

I=0 represents "No inversion" and I=1 marks the inversion.

As to the determination—before the choice of U, U' and possibly inversion—of the numbers $2^0$ to $2^{n-1}$, it results from the definition of the binary coding itself.

FIG. 7 shows in detail an example of an embodiment for the phase coding according to the invention, for the most elaborate case, where the voltages U and U', delivered by the detectors 5 and 6 are only exploited between 0 and $\pi/2$, i.e., in the case corresponding to the basic diagram of FIG. 6.

In order to standardize the circuits, there are two assemblies of identical comparators for the signals U and U', the comparators to $V/2$, 61 and 61', although 61' is basically of no use (it may be used to check the operation) and seven double comparators 621 to 627, 621' to 627', whose thresholds are spaced between 0 and $$\left|\frac{V}{2}\right|$$

the lower threshold being at 621 and 621'.

Designating by $S_1$ to $S_7$ the different thresholds, the digit "0" indicating that the threshold is not exceeded, and "1" that it is exceeded, one may write:

| $S_1$ | $S_2$ | $S_3$ | $S_4$ | $S_5$ | $S_6$ | $S_7$ | $2^2$ | $2^1$ | $2^0$ |
|---|---|---|---|---|---|---|---|---|---|
| 1 | 0 | 0 | 0 | 0 | 0 | 0 | 0 | 0 | 1 |
| 1 | 1 | 0 | 0 | 0 | 0 | 0 | 0 | 1 | 0 |
| 1 | 1 | 1 | 0 | 0 | 0 | 0 | 0 | 1 | 1 |
| 1 | 1 | 1 | 1 | 0 | 0 | 0 | 1 | 0 | 0 |
| 1 | 1 | 1 | 1 | 1 | 0 | 0 | 1 | 0 | 1 |
| 1 | 1 | 1 | 1 | 1 | 1 | 0 | 1 | 1 | 0 |
| 1 | 1 | 1 | 1 | 1 | 1 | 1 | 1 | 1 | 1 |

It can be seen that the number $2^0$ is present for $S_1=1$, is not present for $S_2=1$, is again present for $S_3=1$, and so on.

To this end, the output signals of the thresholds 622, 624, 626 are inverted at 82, 84, 86 and AND circuits 821, 841, 861, connected on one hand to 82, 84, 86 and on the other to 621, 623, 625 supply the OR circuit 90.

The number $2^1$ appears for $S_2=1$, is not present for $S_4=1$, and is again present for $S_6=1$.

To this end, the outputs of 84 and 622 supply the AND circuits 842 and 626 supply and OR circuit 91.

The digit $2^2$ appears when $S_4=1$.

The outputs of 90, 91 and 624 are thus connected to switches 101, 102, 103 which also receive the signals obtained by the identical circuits designated by the same reference numbers with a prime and supplied by U', and these switches are controlled by the signal C.

These switches are connected to circuits 200, 201, 202 which reverse the signal applied to them or not, according to whether the digit $2^{n-3}$ is present or not.

The circuits 200, 201, 202 control directly the digits $2^0$, $2^1$, $2^2$.

Obviously, other combinations can be imagined. More particularly, one could use a single assembly supplied either by U or by U', according to the value of C. However, the described circuit has the advantage of very great rapidity, which is essential in electromagnetic detection.

In the experimental version, in order to avoid errors which might be caused by a time difference in the propagation time in the different circuits, the outputs of the comparators 61 to 621, 61' to 621' are stored and sampled simultaneously.

Of course, the invention is not limited to the embodiments described and shown, which were given merely by way of example; the essential feature is that the choice of the output signal is effected by a logical decision resulting from the signals A and B and additionally from the comparison of the signals U and U'.

What is claimed is:

1. A system for unambigously defining the phase shift $\varphi$ between a first and a second signal comprising:
   first means for phase shifting said first signal by $\pi/2$, thus providing a third signal;
   second means for providing periodic signals having the periodicity of trigonometric lines, respectively representative of the phase shift between said first and second signal and between said first and third signal as $\varphi$ varies from 0 to $2\pi$;
   third means for defining a set of values of at least one of said periodic signals, differing from each other, and respectively corresponding to values of $\varphi$ in predetermined intervals of said variation of $\varphi$, said third means having an output;
   logic means including means having respective outputs for detecting the instantaneous signs of said periodic signals, for determining in which of said intervals is comprised the instantaneous value of $\varphi$, said logic means having an output;
   and selecting means having a control input coupled to said logic means output, a signal input coupled to said third means output, and an output for supplying a signal proportional to said instantaneous value of $\varphi$.

2. A system according to claim 1, wherein said second means supply respectively linearized sine and cosine functions.

3. A system according to claim 1, wherein said intervals being respectively $0-\pi/2$, $\pi/2-3\pi/2$ and $3\pi/2-\pi$, said third means are three linear function generators.

4. A system according to claim 3, wherein said selecting means comprise two input position switches in cascade, respectively controlled by said sign detecting means.

5. A system according to claim 1, wherein said intervals being respectively $0-\pi/4$, $\pi/4-3\pi/4$, $3\pi/4-5\pi/4$, $5\pi/4-7\pi/4$ and $7\pi/4-2\pi$, said third means comprise five linear function generators and said logic means further comprise comparing means supplying a two-level signal according to the sign of the difference of said periodic signals.

6. A system according to claim 5, wherein said selecting means comprise a plurality of switches respectively controlled by said sign detecting means and by said comparing means.

7. A system according to claim 1, wherein said signal proportional to $\varphi$ being supplied in binary digital form with $(n+1)$ digits where $n$ is an integer, said logic means comprise a first EXCLUSIVE OR circuit coupled to said sign detecting outputs and a level inverter circuit coupled to the output of one of said sign detecting means, said circuits having respective outputs respectively controlling the digits of weight $2^{n-1}$ and $2^n$.

8. A system according to claim 7, wherein said logic means further comprise comparing means supplying a two level signals according to the sign of the difference of said periodic signals, a second EXCLUSIVE OR circuit coupled to said first OR circuit and to said comparing means, said second OR circuit controlling the digit of weight $2^{n-2}$.

9. A system for supplying a signal S representative of the relative phase $\varphi$ of a first and a second input signal without ambiguity as $\varphi$ varies between 0 and $2\pi$, said system comprising:
a first and a second general input for receiving said first and second signals;
a first and a second identical phase detecting means of the type supplying a signal proportional to the sine of the phase difference of the signals applied thereto when said signals are sinusoidal signals of identical and constant amplitude, said phase detectors having respective first and second inputs, and respective outputs supplying respective signals U and U', said first general input being coupled to said first and second detector inputs, said second general input being coupled to said second input of said first detector;
phase shifting means having an input coupled to said second general input and an output coupled to said second detector input;
logic means comprising a first and a second input respectively coupled to said first and second phase detector outputs, said logic means having $p$ outputs supplying respectively $p$ output signals, where $p$ is an integer, each of said $p$ signals having one of two predetermined levels, the group of the $p$ signals taking $y$ distinct groups of values, where $y$ is an integer at least equal to 3, according to which the intervals $J_1-J'_1 \ldots J_y-J'_y$ comprises the actual value of $\varphi$, where $J_1-J'_1 \ldots J_y-J'_y$ are the output intervals of variation of the output signals U and U' when $\varphi$ varies in the intervals $I_1-I'_1 \ldots I_y-I'_y$, the whole of the intervals $I_i-I'_i$ ($i=1, 2 \ldots y$) covering the interval $0-2\pi$;
and a circuit for supplying a signal S representative of the value $m_iU+q_iU'+r_i$ where $m_i$, $q_i$, $r_i$ are constant predetermined coefficients within the interval $J_i-J'_i$, the value of $i$ being determined by said logic means, $m_i$ and $q_i$ being not simultaneously equal to zero, and where $m_i$, $q_i$, $r_i$ take $s$ groups of the values where $s$ is an integer smaller than $y$, said circuit comprising at least one main input coupled to at least one phase detector output, and $p$ auxiliary inputs, respectively coupled to said logic means outputs.

10. A system according to claim 9, wherein said circuit for supplying signal S comprises:
a first circuit having at least one input coupled to one of said phase detector outputs, and $s$ outputs, respectively numbered 1 to $s$, supplying respectively simultaneously $s$ values which are linear functions of the signals applied to said first circuit output, said function being of the form $m_iU+q_iU'+r_i$;
and a selector circuit, placed at the outputs of said first circuit, having $p$ control inputs respectively coupled to said $p$ logic means outputs.

11. A system according to claim 10, wherein said logic means comprise a first and a second sign detector having respective inputs respectively coupled to said phase detector outputs and respective outputs supplying respectively the first and the second of said $p$ signals.

12. A system according to claim 10, wherein $y$ being equal to 4, the respective $I_i-I'_i$ intervals being $0-\pi/2$, $\pi/2-\pi$, $\pi-3\pi/2$ and $3\pi/2-2\pi$, $p$ is equal to 2 and $s$ to 3, the coefficients $m_2$, $q_2$, $r_2$ and $m_3$, $q_3$, $r_3$ determined respectively by the intervals $\pi/2-\pi$ and $\pi-3\pi/2$ having respectively the same values and wherein said selector circuit comprises:
a first switch having a control input coupled to said first sign detector output, said switch having an output and two inputs selectively coupled to the first and the second of said first circuit outputs;
and a second switch, having a control input coupled to said second sign detector output, said second switch having two inputs selectively coupled to the third output of said first circuit, and to the output of said first switch, and an output supplying said signal S.

13. A system according to claim 12, wherein one the coefficients $m_1$ and $q_1$ being equal to zero whatever the value of $i$, said first circuit comprises only one input coupled to only one of said first phase detector outputs.

14. A system according to claim 13, where $m_1=m_4=1$, $r_1=0$, $m_2=m_3=-1$, and $r_4=4V$ and $r_2=r_3=2V$ where V is the maximum value of U and U' as $\varphi$ varies between 0 and $2\pi$.

15. A system according to claim 11, wherein $y$ being equal to 8, the respective $I_i-I'_i$ intervals are $0-\pi/4$, $\pi/4-\pi/2$, $\pi/2-3\pi/4$, $3\pi/4-\pi$, $\pi-5\pi/4$, $5\pi/4-3\pi/2$, $3\pi/2-7\pi/4$, $7\pi/4-2\pi$, $p$ is equal to 3 and $s$ to 5, the coefficients $m_2$, $q_2$, $r_2$ and $m_3$, $q_3$, $r_3$, determined respectively by the intervals $\pi/4-\pi/2$ and $\pi/2-3\pi/4$, being respectively equal, the coefficients $m_4$, $q_4$, $r_4$ and $m_5$, $q_5$, $r_5$, determined respectively by the intervals $3\pi/4-\pi$ and $\pi-5\pi/4$, being respectively equal, and the coefficients $m_6$, $q_6$, $r_6$ and $m_7$, $q_7$, $r_7$ determined respectively by the intervals $5\pi/4-3\pi/2$ and $3\pi/2-7\pi/4$ being respectively equal, and wherein said logic means comprise a comparator circuit having at least one input coupled to one of said phase detector outputs and an output supplying the third of said $p$ signals.

16. A system according to claim 15, wherein said selector circuit comprises:
a first switch having a control input coupled to said sign detector output, two signal inputs selectively coupled to said first circuit first and second outputs and an output;
a second switch having a control input coupled to said second sign detector output, two inputs selectively coupled to the output of said first switch and to said first circuit third output;
a third switch having a control input coupled to said first sign detector output, two signal inputs selectively coupled to said first circuit fourth and fifth outputs;
and a fourth switch having a control input coupled to said comparator circuit output, two signal inputs selectively coupled to said second and third switch outputs and an output supplying said signal S.

17. A system according to claim 16, wherein the product $m_i$, $q_i$ is equal to zero whatever the value of $i$.

18. A system according to claim 16, wherein $m_1=m_8=1$, $q_2=q_3=-1$, $m_4=m_5=-1$, $q_6=q_7=1$, $r_1=0$, $r_2=r_3=V$, $r_4=r_5=2V$, $r_6=r_7=3V$ and $r_8=4V$, V being the maximum value of U and U' as $\varphi$ varies between 0 and $2\pi$.

19. A system according to claim 11, wherein said signal S being supplied as a binary coded number with $(n+1)$ digits, said logic means comprise a level inverter having an input coupled to said first sign detector output and an output supplying the first of said $p$ signals, and an EXCLUSIVE OR circuit having two inputs respectively coupled to said sign detector outputs and an output supplying the second of said $p$ signals; and wherein said circuit supplying signal S comprises:

$n$ indicators of binary digits of respective weights $2^0$, $2^1$, $2^2$ ... $2^n$ having respective control inputs; a binary coding circuit for coding into a $x$ digit binary number wherein $x$ is an integer smaller than $n$, having at least one signal input coupled to the output of one of said phase detectors and $x$ outputs;

$x$ inverting circuits placed respectively in derivation at each of said coding circuit outputs, said inverting circuits having respective outputs;

and a selector circuit controlled by said logic means for selectively coupling said indicators to said coding circuit outputs and to said inverter outputs;

and wherein said level inverter output is coupled to the control input of weight $2^n$ and said EXCLUSIVE OR circuit output is coupled to the control input of the digit of weight $2^{n-1}$.

20. A system according to claim 19, wherein $p$ being taken equal to 2, $x$ is equal to $n-1$ and said selector circuit is controlled by the output signal of said EXCLUSIVE OR circuit.

21. A system according to claim 20, wherein said logic means comprises only one input coupled to said first phase detector output.

22. A system according to claim 19 wherein $p$ being equal to 2, $x$ is equal to $n-2$ and wherein said logic means comprise further EXCLUSIVE OR circuit having two inputs, respectively coupled to said first EXCLUSIVE OR circuit output and to said comparator output and an output coupled to the control input of the indicator of the digit of weight $2^{n-2}$ and to said selector circuit control input.

23. A system according to claim 22, wherein said logic means comprise a comparator circuit having at least one input coupled to the output of one of said phase detector and an output, and said coding circuit comprises two inputs selectively coupled to the outputs of said first and second phase detectors, according to the sign of said comparator circuit output signal.

24. A system according to claim 23, wherein said coding circuit comprises two distinct and identical portions respectively coupled to the outputs of the first and the second phase detectors, and wherein a switch having a control input coupled to said comparator output coupled selectively said first and second portions to the signal input of said selector circuit.

References Cited

UNITED STATES PATENTS

| | | | |
|---|---|---|---|
| 2,933,682 | 4/1960 | Moulton et al. | 328—133X |
| 3,012,200 | 12/1961 | Hurvitz | 328—134 |
| 3,205,438 | 9/1965 | Buck | 328—133X |
| 3,417,342 | 12/1968 | Kocher | 331—14X |
| 3,469,196 | 9/1969 | Cowin et al. | 328—133 |

JOHN S. HEYMAN, Primary Examiner

U.S. Cl. X.R.

324—83; 328—109, 118, 147, 154